(12) United States Patent
Hasmann et al.

(10) Patent No.: US 11,148,825 B2
(45) Date of Patent: Oct. 19, 2021

(54) FLYING BOOM MAST FOR MULTI-PURPOSE AERIAL REFUELING AIRCRAFT

(71) Applicant: EMBRAER S.A., São José dos Campos—SP (BR)

(72) Inventors: Paulo Henrique Hasmann, São José dos Campos—SP (BR); Marcos Vinicius, São José dos Campos—SP (BR); Gabriel Kendjy Koike, São José dos Campos—SP (BR); Cristian Escobar Santiago, São José dos Campos—SP (BR); Rodrigo Pinto Moreira Piedras, São José dos Campos—SP (BR); Reinaldo Pinto Dias Junior, São José dos Campos—SP (BR)

(73) Assignee: Embraer S.A., San José dos Campos-SP (BR)

( * ) Notice: Subject to any disclaimer, the term of this patent is extended or adjusted under 35 U.S.C. 154(b) by 566 days.

(21) Appl. No.: 15/994,032

(22) Filed: May 31, 2018

(65) Prior Publication Data

US 2018/0346141 A1    Dec. 6, 2018

Related U.S. Application Data

(60) Provisional application No. 62/514,230, filed on Jun. 2, 2017.

(51) Int. Cl.
*B64D 39/02* (2006.01)
*B64D 39/06* (2006.01)
(Continued)

(52) U.S. Cl.
CPC ............ *B64D 39/02* (2013.01); *B64C 1/1415* (2013.01); *B64D 39/00* (2013.01); *B64D 39/04* (2013.01); *B64D 39/06* (2013.01)

(58) Field of Classification Search
CPC ........ B64D 39/00; B64D 39/02; B64D 39/04; B64D 39/06; B64C 1/1415
See application file for complete search history.

(56) References Cited

U.S. PATENT DOCUMENTS

| 3,055,620 | A | * | 9/1962 | Weiland | ................. | B64D 39/04 244/135 A |
| 4,088,288 | A | * | 5/1978 | Barnes | .................. | B64C 1/1415 14/69.5 |

(Continued)

OTHER PUBLICATIONS

International application No. PCT/BR2018/000029. International Preliminary Report on Patentability. (dated 2019).*

(Continued)

*Primary Examiner* — Brian M O'Hara
*Assistant Examiner* — Michael B. Kreiner
(74) *Attorney, Agent, or Firm* — Nixon & Vanderhye, P.C.

(57) ABSTRACT

Cargo aircraft having a cargo ramp and cargo door oppositely hinged relative to one another to allow access to the aircraft's cargo space may be provided with a flying boom mast that is physically mounted at the aft portion of the fuselage so as to configure such cargo aircraft for aerial refueling operations. The flying boom mast may therefore be operably associated with the aft portion of the fuselage and moveable between a stowed and deployed conditions relative to the aft portion of the fuselage, while a fuel supply line fluid-interconnects the flying boom mast with an on-board fuel supply of the aircraft so as to allow aerial refueling of a receiver aircraft when the flying boom mast is in the deployed condition thereof.

11 Claims, 5 Drawing Sheets

(51) Int. Cl.
*B64D 39/00* (2006.01)
*B64C 1/14* (2006.01)
*B64D 39/04* (2006.01)

(56) References Cited

U.S. PATENT DOCUMENTS

| | | | | |
|---|---|---|---|---|
| 4,097,009 A | * | 6/1978 | Barnes | B64C 1/1415 244/129.5 |
| 4,498,648 A | * | 2/1985 | DeLuca | B64C 1/22 244/118.3 |
| 5,241,722 A | * | 9/1993 | Rohrlick | B64D 9/00 14/71.5 |
| 5,253,381 A | * | 10/1993 | Rawdon | B64C 1/22 14/71.5 |

OTHER PUBLICATIONS

International application No. PCT/BR2018/000029. Written Opinion of the International Searching Authority (dated 2019).*

* cited by examiner

FLYING BOOM MAST FOR MULTI-PURPOSE AERIAL REFUELING AIRCRAFT

CROSS-REFERENCE TO RELATED APPLICATION

This application is based on and claims domestic priority benefits from U.S. Provisional Application Ser. No. 62/514,230 filed on Jun. 2, 2017, the entire contents of which are expressly incorporated hereinto by reference.

FIELD

The embodiments disclosed herein relate generally to aerial refueling systems which include an operator-controlled flying boom mast. In preferred embodiments, the flying boom mast is operatively associated with an aerial refueling aircraft that allows the aircraft to serve multiple mission roles other than refueling (e.g., as a troop and/or material transport aircraft).

BACKGROUND

Flying boom masts are commonly employed to transfer fuel from one aircraft (known as a "tanker") to another aircraft (known as the "receiver") during flight. In such a manner therefore, military aircraft may be aerially refueled multiple times so as to allow substantially longer deployment periods on target stations and/or to increase aircraft range than their normal fuel load would permit.

The conventional flying boom system associated with an aerial tanker aircraft is generally comprised of three component parts: (1) a control station, (2) auxiliary systems and (3) a mast. The control station will usually have seats for the on-board flying boom operator responsible for the controllable maneuvering of the mast and the transfer of fuel to the receiver aircraft once connection between the receiver aircraft and the mast has occurred. The on-board auxiliary systems are typically comprised of several electronic control boxes, fuel pumps, actuators, sensors and the like. Normally such auxiliary components will be installed in several spaced locations within the tanker aircraft. The mast is usually anchored to the lower rear portion of the tanker aircraft's fuselage and will typically include multiple aerodynamic control surfaces installed on a non-anchored distal extremity of the mast to allow the on-board operator to maneuver the terminal end of the mast in the tanker aircraft's slipstream. The mast will also typically include a telescopic tube which is capable of being extended toward the receiver aircraft during an aerial refueling operation so as to allow the mast to reach and make connection to the receiver aircraft in order to transfer fuel during flight. The telescopic tube is therefore also capable of being retracted away from the receiver aircraft once the aerial refueling operation has been completed.

Airborne tanker aircraft are typically heavy civilian commercial aircraft that have been converted to conduct airborne refueling missions. The conversion of civilian commercial aircraft to aerial tanker capabilities is desirable due to, among other reasons, the extremely large on-board fuel capacity of such aircraft resulting in a concomitant long range capability, an increased cargo capacity (e.g., so as to allow stowage of extra fuel tanks and thus increased fuel off-loading capabilities for in-flight refueling operations).

The conversion of commercial aircraft as a basic platform for aerial refueling operations is also desirable due to the reduced cost of conversion since only relatively mission-specific military-grade equipment and systems need to be installed, such as self-protection systems, configurable cabin floor for multiple configurations, military communication systems and aerial refueling systems (e.g., the flying boom mast, under-wing pods and fuselage refueling units). To remove and install such military-grade systems is not a simple endeavor and usually consumes several days or even weeks to complete. Therefore, all these military-grade equipment and systems are permanently installed when converting the commercial aircraft for aerial tanker operations such that they do not obstruct cargo and cabin doors and such that the aircraft can be loaded/off-loaded or have its interior quickly modified from one configuration to another without removing any military system previously installed, such as the under-wing pods, self-protection systems or flying boom mast.

Such an approach can also be considered for certain types of aircraft that have a cargo door located in the rear portion of the fuselage. Generally, conventional cargo doors are divided in two sections, i.e., the ramp section and the door section. The ramp section usually can be used as an extension of the cargo floor and also improves the accessibility of the cargo compartment when the aircraft is on the ground. The door section closes the cargo compartment. Both such sections, when closed, need to ensure a minimum leakage of air from the interior cabin during flight. They also need to be fully opened on the ground in order to allow full access to the cargo compartment for loading/offloading operations or to quickly install any specific interior configuration such as those allowing for medical evacuation (Medevac), passenger seats, firefighting, troop transport operations and the like.

For these types of cargo aircraft, no mission-related systems are installed on the ramp or door sections in order to not obstruct the accessibility of the cargo compartment. Thus, no flying boom mast is known to have ever been installed on this type of cargo aircraft since such an installation was thought to have adversely affected the multi-role configuration of the aircraft and since it would also take several days or even weeks to be installed or removed whenever a configuration had to be changed by the aircraft user. Another possible reason that a flying boom system has never been known to be installed on this type of cargo aircraft are the high loads that would be generated during aerial refueling operation and transmitted to the aircraft through a non-fixed part (i.e., the ramp section or door section) that could lead to fuselage damage.

Due economic reasons, aircraft operators will usually request multi-mission capabilities for aircraft that will permit the aircraft to perform a number of varied mission demands based on an ability of the aircraft to undergo a quick configuration change performed by the aircraft operator's technicians. It would therefore be highly desirable if known cargo-type multi-purpose aircraft could be configured to assume an aerial tanker role by the installation of a flying boom mast and associate aerial refueling systems. It is therefore towards fulfilling such a need that the embodiments disclosed herein are directed.

SUMMARY

In general, the embodiments disclosed herein are directed toward cargo aircraft which are provided with a flying boom mast that is physically mounted at the aft portion of the fuselage of a cargo aircraft configured with a ramp and door allowing access to the aircraft's cargo space. More specifically, the cargo aircraft which is configurable for aerial refueling operations will include a fuselage having a forward cargo ramp and an aft cargo door oppositely hinged relative to one another at an aft portion of the fuselage so as to be moveable between opened and closed positions to respectively open and close a cargo space within the fuselage. A flying boom mast system having a flying boom mast operably associated with the aft portion of the fuselage and moveable between a stowed and deployed conditions relative to the aft portion of the fuselage. A fuel supply line will thus be provided so as to connect the flying boom mast with an on-board fuel supply of the aircraft so as to allow aerial refueling of a receiver aircraft when the flying boom mast is in the deployed condition thereof.

A vision system operatively installed in the cargo ramp or the cargo door so as to allow an operator within the aircraft to visually control the flying boom mast during aerial refueling.

The flying boom mast system may be provided with a winch assembly and a flexible tether cable connected to the flying boom mast, wherein operation of the winch assembly causes the flexible tether cable to move the flying boom mast between the stowed and deployed conditions thereof.

According to one embodiment, the cargo ramp comprises a connection boss at an exterior location thereof, and wherein the flying boom mast is journally connected to the connection boss. In such an embodiment, therefore, the cargo ramp may include a vision system to allow an operator within the aircraft to visually control the flying boom mast during aerial refueling. A control console may be positioned within the cargo space of the aircraft to allow the operator to control operation of the flying boom mast during aerial refueling (e.g., with visual input being provided by the vision system).

According to another embodiment, the cargo door comprises a connection boss such that the flying boom mast is journally connected to the connection boss. In such an embodiment, the vision system may be provided operatively with the cargo door.

According to yet another embodiment, a tail cone housing may be provided to receive the flying boom mast when in the stowed condition thereof. In such an embodiment, an actuator assembly may be positioned at an aft end of the aircraft and operatively connected to the flying boom mast for reciprocally moving the flying boom mast between retracted and extended positions relative to the tail cone housing. According to certain embodiments, the actuator assembly may include a tubular receiver for receiving a portion of the flying boom mast when in the retracted position thereof, and a piston member journally connected to a proximal end of the flying boom mast for reciprocally moving the flying boom mast between the retracted and extended positions thereof. The piston member may be operable by any suitable motive system, e.g., electrical, hydraulic and/or pneumatic drive systems.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which.

DETAILED DESCRIPTION

Figure 1:
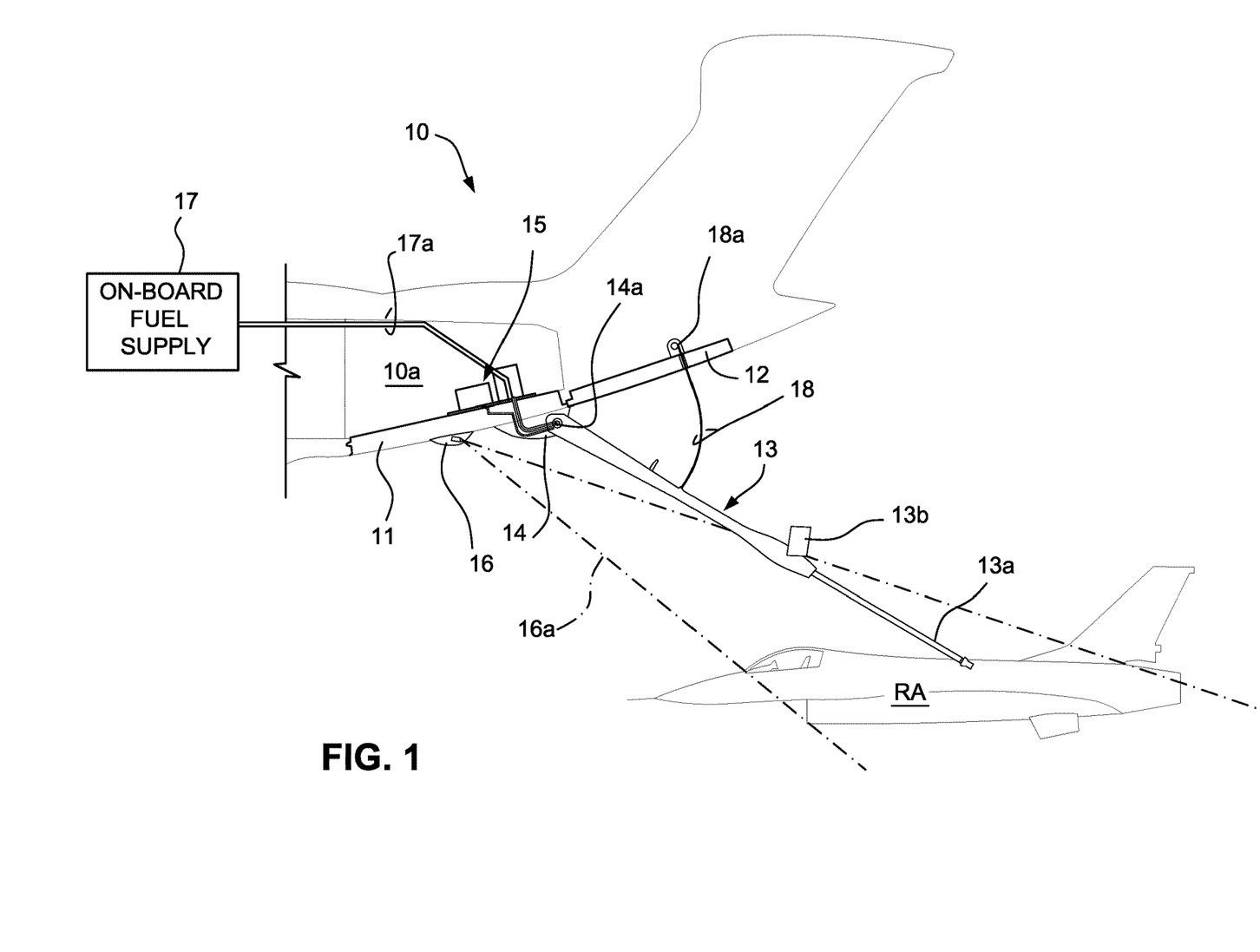
FIG. 1 is a schematic view partly in section of an aft portion of a cargo aircraft provided with a refueling flying boom mast attached to an especially configured ramp section thereof according to a first embodiment of the invention.

Accompanying FIG. 1 depicts a first embodiment of a cargo (refueling) aircraft 10 provided with a rear cargo door access having oppositely hinged forward cargo ramp 11 and aft cargo door 12. According to the embodiment depicted in FIG. 1, the proximal end of a flying boom mast 13 is journally attached by a journal connection assembly 14a to a support boss 14 rigidly associated with the cargo ramp 11. As is conventional, the flying boom mast 13 may be provided with a distal telescopically extendible portion 13a for connection to the receiving aircraft RA during a refueling operation and control surfaces 13b to allow an operator located, for example, in the flight deck (not shown) to control the flying boom mast 13 through the control rack 15 located inside the cargo space 10a of the aircraft 10.

A vision system 16 having a vision field 16a is also provided on the cargo door 11 so as to allow the operator to visually monitor the receiving aircraft RA and the relative location of the distal end of the telescopically extendible portion 13a of the flying boom mast 13 so that connection can be made between the receiving aircraft RA and the mast 13 during refueling operations (e.g., by controllably moving the control surfaces 13b therefor at the control console that may be located in the flight deck through the control rack 15). Once operative connection has been achieved between the mast 13 and the receiving aircraft RA, fuel may be introduced by the operator to discharge fuel from the cargo (refueling) aircraft 10 to the receiving aircraft RA via a fuel line 17a fluid connected to an on-board fuel supply 17 of the cargo (refueling) aircraft 10.

The flying boom mast 13 may be deployed between its operative refueling positions whereby the distal end therefor trails the aircraft 10 as shown in FIG. 1 and retrieved from such operative position so as to be stowed during periods of nonuse adjacent to the cargo door 12 by means of a flexible tether cable 18. The distal end of the flexible tether cable 18 is connected to the boom mast 13 while a proximal end of the cable 18 is connected to a winch system 18a positioned on an interior portion of the cargo door 12.

The system comprising the flying boom mast 13, control rack 15 and tether cable 18 as depicted in FIG. 1 may be provided as a removable kit whereby all or some of such components may be readily removed from and reinstalled onto the aircraft 10 when the operator desires to convert the aircraft 10 from a cargo-carrying mission to an aerial refueling mission. Thus, for example, the boom mast 13 and its associated operative components may be removed physically from its journalled connected to the boss 14 on the exterior side of the cargo ramp 11 so that the latter may be hingedly moved between its closed condition to an opened condition to allow access to the cargo compartment 10*a*. If needed, the control rack 15 and associated fuel lines may be removed from or simply relocated within the aircraft 10 for future use.

Figure 2A:
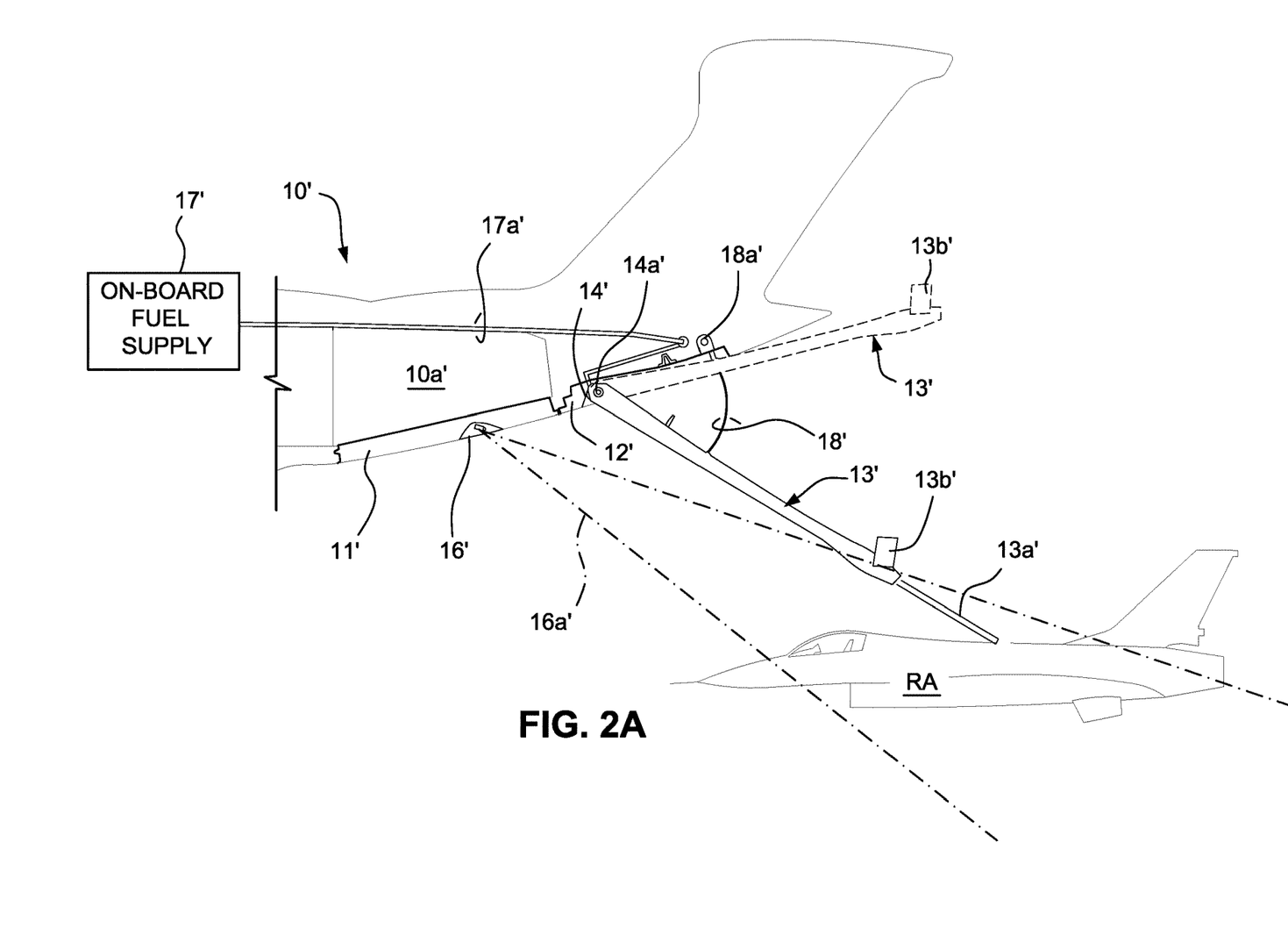
FIGS. 2A and 2B are schematic views partly in section of an aft portion of a cargo aircraft provided with a refueling flying boom mast attached to an especially configured door section thereof according to a second embodiment which respectively depict the door section in a closed configuration allowing aerial refueling operations and an opened configuration allowing ground loading/offloading cargo operations.
Figure 2B:
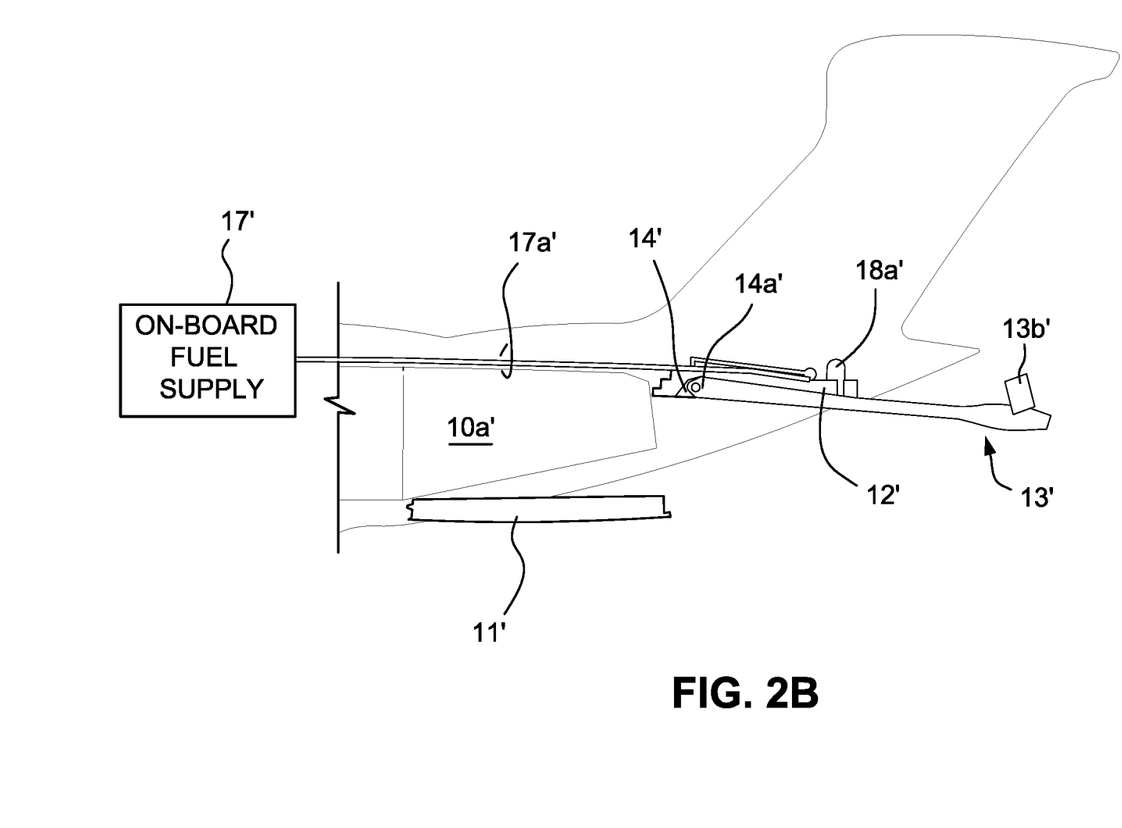

An alternative embodiment of a cargo aircraft 10' provided with a cargo ramp 11' and a cargo door 12' is depicted in FIGS. 2A and 2B. In this regard, the structures that have been described previously with respect to the embodiment of FIG. 1 that are similarly represented in the embodiment of FIGS. 2A and 2B are denoted by the same reference numeral but with a prime designation (') for the latter. It will be observed that the embodiment of FIGS. 2A and 2B differs principally from the embodiment depicted in FIG. 1 by the journalled attachment 14*a*' of the proximal end of the boom mast 13' to a boss 14' associated with the aft cargo door 12' rather than the cargo ramp 11'. In such an embodiment, therefore, the boom mast 13' does not necessarily require removal from the cargo door 12' in order to allow the cargo door 12' and cargo ramp 11' to be opened thereby gaining access to the cargo space 10*a*' within the aircraft 10' and thereby permit cargo/troop ingress egress while the aircraft is on the ground. Such a state is shown in FIG. 2B.

However, as shown in FIG. 2A, the cargo ramp 11' and cargo door 12' may be closed to allow the boom mast 13' to be operably moved between a stowed condition (shown in dashed line in FIG. 2A) and a deployed condition (shown in solid line in FIG. 2A) by means of an operator at a control station (not shown in FIGS. 2A and 2B, but which could be located, for example, in the flight deck) within the interior of the aircraft 10' whereby aerial refueling of a receiving aircraft RA may occur. Thus, the embodiment depicted in FIGS. 2A and 2B allow the aircraft 10' to function for both cargo/troop transport missions as well as aerial refueling missions without necessarily removing the boom mast 13' and its associated components.

Figure 3A:
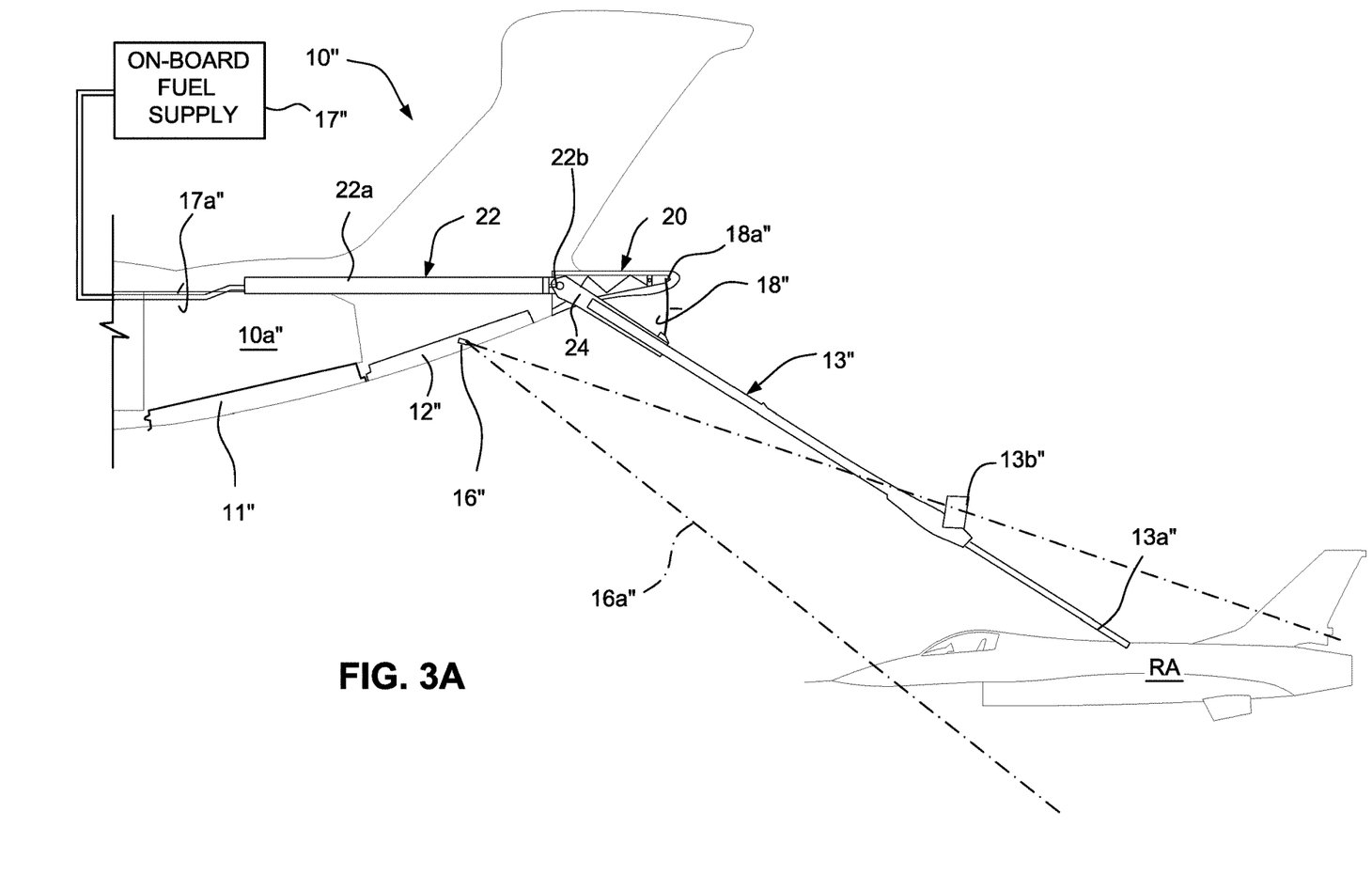
FIGS. 3A and 3B are schematic views partly in section of an aft portion of a cargo aircraft provided with a refueling flying boom mast operatively associated with a tail cone section thereof according to a third embodiment which respectively depict the flying boom mast in an extended condition with the ramp and door sections in a closed configuration thereby allowing aerial refueling operations and in a retracted condition with the ramp and door sections in an open configuration allowing ground loading/offloading cargo operations.
Figure 3B:
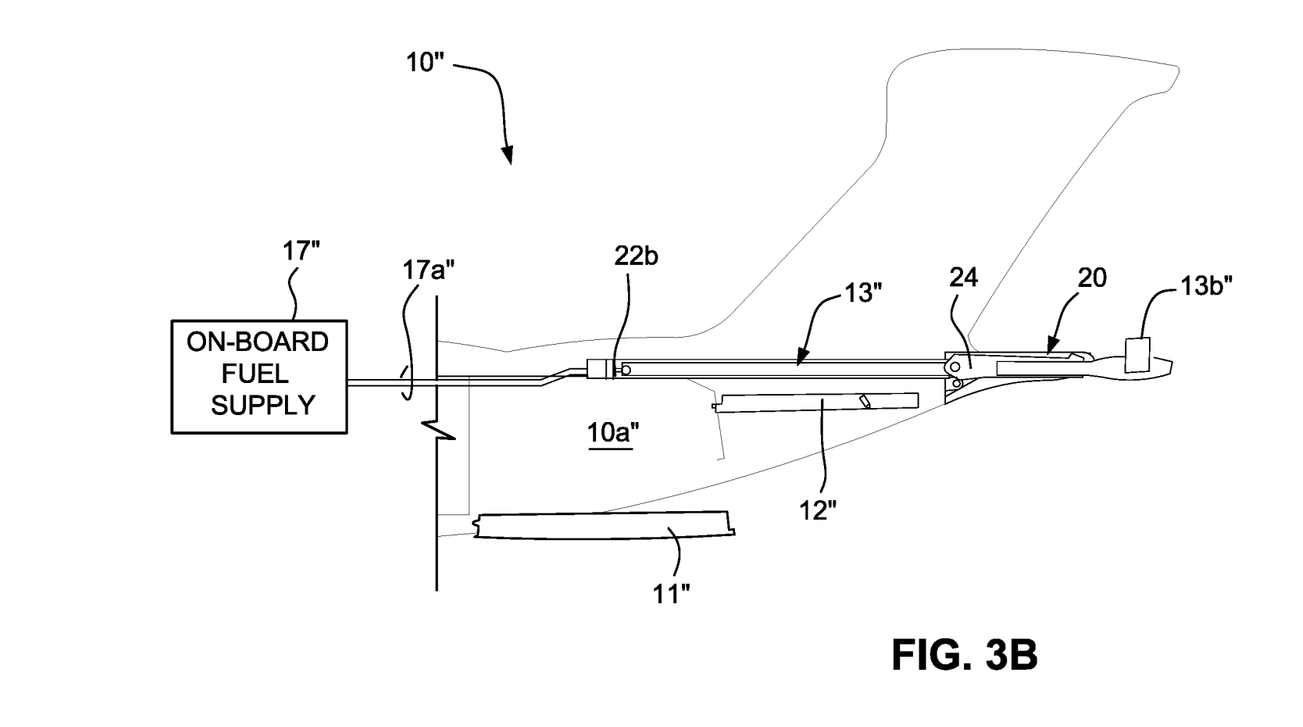

An alternative embodiment of a cargo aircraft 10" provided with a cargo ramp 11" and a cargo door 12" is depicted in FIGS. 3A and 3B. In this regard, the structures that have been described previously with respect to the embodiment of FIG. 1 that are similarly represented in the embodiment of FIGS. 3A and 3B are denoted by the same reference numeral but with a double-prime designation (") for the latter. It will be observed that the embodiment of FIGS. 3A and 3B differs principally from the embodiment depicted in FIG. 1 by providing a tail cone housing 20 for the boom mast 13" when the latter is in the stowed condition as shown in FIG. 3B.

The embodiment depicted in FIGS. 3A and 3B also includes an actuator assembly 22 positioned at the aft end of the aircraft 10" which is comprised of a tubular receiver 22*a* having a reciprocally moveable piston member 22*b* therewithin. The piston member 22*b* may be operable between a retracted position as shown in FIG. 3B and an extended position as shown in FIG. 3A by any suitable motive system, e.g., electrical, pneumatic and/or hydraulic motive systems. A proximal end of the boom mast 13" is therefore journally connected to the piston member 22*b* so as to be moved thereby between its stowed condition (FIG. 3B) and its deployed condition (FIG. 3A) in response to the piston member 22*b* being moved between its retracted and extended positions, respectively. In the embodiment depicted in FIGS. 3A and 3B, the tail cone housing 20 will contain the tether cable 18" and winch assembly 18*a*" so as to assist in movement of the mast 13" between such retracted and extended positions.

The boom mast 13" is slideably received within a journally mounted tubular guide member 24 operatively housed within the tail cone housing 20 so as to allow the mast 13" to be moved by an operator at a control station (not shown in FIGS. 3A and 3B, which could, for example, be located in the flight deck) controllably operating the boom mast mechanisms and positioning relative to the receiving aircraft RA. The fuel line 17*a*" must of course be capable of being extended/retracted with the deployment/stowage of the boom mast 13", e.g., by providing a reel and hose assembly (not shown) located within the cargo space 10*a*" or some other convenient location within the aircraft 10". The fuel line 17*a*" could also be connected to the actuator assembly 22 through a rigid or flexible coupling connection, in such a way that the transferred fuel flows through the actuator assembly 22 to reach the boom mast 13" and be transferred to the receiver aircraft RA.

The embodiment of the invention depicted by FIGS. 3A and 3B, like the embodiment depicted in FIGS. 2A and 2B, does not necessarily require removal from the cargo ramp 11" and/or cargo door 12" in order to allow the cargo door 12" and cargo ramp 11" to be opened thereby gaining access to the cargo space 10*a*" within the aircraft 10" and thereby permit cargo/troop ingress egress while the aircraft is on the ground (e.g., as shown by FIG. 3B). Thus, the embodiment depicted in FIGS. 3A and 3B allow the aircraft 10" to function for both cargo/troop transport missions as well as aerial refueling missions without necessarily removing the boom mast 13" and its associated components from the aircraft 10".

While the invention described herein has been disclosed previously in reference to the accompanying drawings, it will be understood that such a description is presently considered to be the most practical and preferred embodiments of the invention. Thus, the invention is not to be limited to the disclosed embodiment, but on the contrary, is intended to cover various modifications and equivalent arrangements included within the spirit and scope thereof.

What is claimed is:

1. A cargo aircraft configurable for aerial refueling operations comprising:
  a fuselage having an interior cargo space and an aft opening providing access to the interior cargo space;
  a forward cargo ramp, and
  an aft cargo door opposingly positioned relative to the forward cargo ramp,
    wherein
    the forward cargo ramp and the aft cargo door are moveable between closed and opened conditions so as to close and open, respectively, the aft opening of the interior cargo space, and wherein
    the forward cargo ramp and the aft cargo door are hinged to the fuselage at the forward and aft ends thereof, respectively, to allow the forward cargo ramp and the aft cargo door to be pivotally moveable in opposite directions relative to one another between the closed and opened conditions thereof such that (i) the forward cargo ramp and aft cargo door are respectively in raised and lowered positions when in the closed condition with terminal ends of the forward cargo ramp and the aft cargo door in opposition to one another to thereby close the aft opening of the interior cargo space within the fuselage, and (ii) the forward cargo ramp and aft cargo door are respectively in lowered and raised positions such that the terminal ends of the forward cargo ramp and aft cargo door are spaced apart from one another to thereby allow access to the interior cargo space within the fuselage;

a flying boom mast system having a flying boom mast operably associated with the aft cargo door so as to be moveable with the aft cargo door between the lowered and raised positions thereof when the forward cargo ramp and the aft cargo door are moved between the closed and opened conditions, respectively, wherein the flying boom mast includes a proximal end which is journally attached to the aft cargo door so that a distal end of the flying boom mast is moveable between a stowed condition wherein the flying boom mast is positionally adjacent the aft cargo door and a deployed condition wherein the flying boom mast positionally extends downwardly away from the aft cargo door; and a fuel supply line connecting the flying boom mast with an on-board fuel supply of the aircraft so as to allow aerial refueling of a receiver aircraft when the flying boom mast is in the deployed condition thereof.

2. The cargo aircraft according to claim 1, further comprising a vision system operatively installed in the forward cargo ramp so as to allow an operator within the aircraft to visually control the flying boom mast during aerial refueling.

3. The cargo aircraft according to claim 1, wherein the flying boom mast system comprises a winch assembly and a flexible tether cable connected to the flying boom mast, wherein operation of the winch assembly causes the flexible tether cable to move the flying boom mast between the stowed and deployed conditions thereof.

4. The cargo aircraft according to claim 1, further comprising a control rack positioned within the interior cargo space of the fuselage to allow operational control of the flying boom mast during aerial refueling.

5. The cargo aircraft according to claim 1, wherein the cargo door comprises a connection boss, and wherein the flying boom mast is journally connected to the connection boss.

6. The cargo aircraft according to claim 5, wherein the cargo ramp includes a vision system to allow an operator within the aircraft to visually control the flying boom mast during aerial refueling.

7. The cargo aircraft according to claim 5, wherein the flying boom mast system comprises a winch assembly and a flexible tether cable connected to the flying boom mast, wherein operation of the winch assembly causes the flexible tether cable to move the flying boom mast between the stowed and deployed conditions thereof.

8. A method to provide aerial refueling capability to a cargo aircraft having a fuselage which includes a forward cargo ramp and an aft cargo door oppositely hinged relative to one another at an aft portion of the fuselage so as to be pivotally moveable in opposite directions between opened and closed positions to respectively open and close a cargo space within the fuselage, wherein the method comprises:

(a) operably providing a flying boom mast system by journally attaching a proximal end of a flying boom mast to the aft cargo ramp to allow the flying boom mast to be moveable between a stowed condition wherein the flying boom mast is positionally adjacent the aft cargo door and a deployed condition wherein the flying boom mast positionally extends downwardly away from the aft cargo door; and (b) fluid-interconnecting the flying boom mast and an on-board fuel supply of the aircraft with a fuel line so as to allow aerial refueling of a receiver aircraft when the flying boom mast is in the deployed condition thereof.

9. The method according to claim 8, wherein step (a) is practiced by journally attaching the flying boom mast to a connection boss associated with the aft cargo door.

10. The method according to claim 8, wherein step (a) comprises interconnecting a flexible tether cable between flying boom mast and a winch assembly to allow movement of the flying boom mast between the stowed and deployed conditions thereof.

11. The method according to claim 8, which further comprises providing the forward cargo ramp with a vision system to allow an operator within the aircraft to visually control the flying boom mast during aerial refueling.

* * * * *